US012629968B2

(12) United States Patent
Haba

(10) Patent No.: US 12,629,968 B2
(45) Date of Patent: May 19, 2026

(54) HEAVY DUTY TIRE

(71) Applicant: Sumitomo Rubber Industries, Ltd.,
Hyogo (JP)

(72) Inventor: Toshifumi Haba, Hyogo (JP)

(73) Assignee: Sumitomo Rubber Industries, Ltd.,
Hyogo (JP)

( * ) Notice: Subject to any disclaimer, the term of this
patent is extended or adjusted under 35
U.S.C. 154(b) by 183 days.

(21) Appl. No.: 17/395,422

(22) Filed: Aug. 5, 2021

(65) Prior Publication Data

US 2022/0063350 A1     Mar. 3, 2022

(30) Foreign Application Priority Data

Aug. 27, 2020     (JP) ................................. 2020-143713

(51) Int. Cl.
B60C 1/00          (2006.01)
B60C 11/00         (2006.01)
(Continued)

(52) U.S. Cl.
CPC ........ B60C 15/0607 (2013.01); B60C 1/0016
(2013.01); B60C 11/005 (2013.01);
(Continued)

(58) Field of Classification Search
CPC . B60C 1/0016; B60C 11/0041; B60C 11/005;
B60C 2011/0016; B60C 2011/0033
See application file for complete search history.

(56) References Cited

U.S. PATENT DOCUMENTS 5,430,088 A      7/1995  Ohashi et al.
5,512,626 A *    4/1996  Matsuo ................. B60C 11/005
                                                                 525/196

(Continued)

FOREIGN PATENT DOCUMENTS

EP          0 738 614 A1      10/1996
EP          1 535 961 A1      6/2005
(Continued)

OTHER PUBLICATIONS

The extended European search report issued by the European Patent
Office on Jan. 28, 2022, which corresponds to European Patent
Application No. 21189795.4-1012 and is related to U.S. Appl. No.
17/395,422.
(Continued)

*Primary Examiner* — Justin R Fischer
(74) *Attorney, Agent, or Firm* — Studebaker Brackett
PLLC

(57)                ABSTRACT
An object of the present invention is to provide a heavy duty
tire having improved fuel efficiency, wet grip performance,
abrasion resistance, chipping resistance, and tear resistance
with good balance. The heavy duty comprises a carcass
extending from a tread part through a sidewall part to a bead
core of a bead part and a belt layer arranged outside in a tire
radial direction of the carcass and inside of the tread part,
wherein the tread has a cap rubber layer and a base rubber
layer, the cap rubber layer comprises a predetermined rubber
component and silica and the loss tangent tan δ of the base
rubber layer is within a predetermined range.

19 Claims, 2 Drawing Sheets

(51) Int. Cl.
   *B60C 15/06*      (2006.01)
   *C08K 3/36*      (2006.01)
   *C08K 5/548*     (2006.01)
   *C08L 9/00*      (2006.01)

(52) U.S. Cl.
   CPC ................ *C08K 3/36* (2013.01); *C08K 5/548* (2013.01); *C08L 9/00* (2013.01); *B60C 2001/0083* (2013.01); *B60C 2200/06* (2013.01); *C08K 2201/006* (2013.01)

(56) References Cited

U.S. PATENT DOCUMENTS

| | | | | |
|---|---|---|---|---|
| 5,851,321 | A | * | 12/1998 | Midorikawa ......... B60C 1/0016 |
| | | | | 152/209.5 |
| 2004/0244894 | A1 | * | 12/2004 | Segatta ..................... B60C 9/28 |
| | | | | 152/196 |
| 2005/0250883 | A1 | | 11/2005 | Shibata et al. |
| 2007/0084533 | A1 | | 4/2007 | Numata |
| 2010/0036019 | A1 | * | 2/2010 | Miyazaki ................ C08L 21/00 |
| | | | | 523/157 |
| 2010/0154949 | A1 | * | 6/2010 | Nagai ....................... B60C 3/06 |
| | | | | 152/209.5 |
| 2011/0112214 | A1 | * | 5/2011 | Kojima ..................... C08L 7/00 |
| | | | | 523/156 |
| 2011/0245370 | A1 | * | 10/2011 | Uesaka ..................... C08L 7/00 |
| | | | | 524/506 |
| 2014/0350879 | A1 | | 11/2014 | Takiguchi et al. |
| 2017/0166012 | A1 | | 6/2017 | Todoroki |
| 2018/0297406 | A1 | | 10/2018 | Yokoyama |
| 2020/0114694 | A1 | | 4/2020 | Hiraishi |
| 2021/0221177 | A1 | | 7/2021 | Fujii |

FOREIGN PATENT DOCUMENTS

| | | | | | |
|---|---|---|---|---|---|
| EP | 2752447 | A1 | | 7/2014 | |
| EP | 3 301 132 | A1 | | 4/2018 | |
| EP | 3301130 | | * | 4/2018 | |
| JP | H02-206631 | A | | 8/1990 | |
| JP | H04-118305 | A | | 4/1992 | |
| JP | H06-279624 | A | | 10/1994 | |
| JP | 2004-091715 | A | | 3/2004 | |
| JP | 2011-173438 | A | | 9/2011 | |
| JP | 2013049409 | A | * | 3/2013 | .......... B60C 1/0016 |
| JP | 2013-210355 | A | | 10/2013 | |
| JP | 2014-118117 | A | | 6/2014 | |
| JP | 2018-177980 | A | | 11/2018 | |
| JP | 2019-001322 | A | | 1/2019 | |
| WO | 2012/133426 | A2 | | 10/2012 | |
| WO | 2019/220680 | A1 | | 11/2019 | |

OTHER PUBLICATIONS

Reconsideration Report before Appeal mailed by the Japanese Patent Office on Jan. 7, 2025, which corresponds to Japanese Patent Application No. 2020-143713 and is related to U.S. Appl. No. 17/395,422; with English language translation.
An Office Action; "Notice of Reasons for Refusal," mailed by the Japanese Patent Office on Apr. 23, 2024, which corresponds to Japanese Patent Application No. 2020-143713 and is related to U.S. Appl. No. 17/395,422; with English language translation.

* cited by examiner

FIG. 2

HEAVY DUTY TIRE

TECHNICAL FIELD

The present invention relates to a heavy duty tire having improved fuel efficiency, wet grip performance, abrasion resistance, chipping resistance, and tear resistance with good balance.

BACKGROUND OF THE INVENTION

As a method of improving abrasion resistance of a tire for a truck/bus, a technique of making carbon black to be micronized or to be a high structure is known (for example, JP H06-279624 A).

SUMMARY OF THE INVENTION

It cannot be said that the above-described method of making carbon black to be micronized or to be a high structure is sufficient for improving fuel efficiency of a tire. Moreover, dispersibility of carbon black also deteriorates due to deterioration of processability due to micronization, and conversely, abrasion resistance of a tire may deteriorate. Therefore, there is a limit to a method of improving performance by improving a conventional carbon black.

Moreover, due to influences of recent environmental regulations, there has been a growing demand for highly achieving abrasion resistance, as well as fuel efficiency, wet grip performance, chipping resistance, and the like, even in a tire for a truck/bus.

An object of the present invention is to provide a heavy duty tire having improved fuel efficiency, wet grip performance, abrasion resistance, chipping resistance, and tear resistance with good balance.

As a result of intensive studies, the present inventor has found that the above-described problems can be solved by compounding a predetermined rubber component and silica in a cap rubber layer constituting a tread and setting a loss tangent tan δ of a base rubber layer within a predetermined range, in a tire having a predetermined configuration, and completed the present invention.

That is, the present invention relates to:

[1] A heavy duty tire comprising a carcass extending from a tread part through a sidewall part to a bead core of a bead part and a belt layer arranged outside in a tire radial direction of the carcass and inside of the tread part, wherein the belt layer is formed by a belt ply comprising a first belt layer, a second belt layer, and a third belt layer which are laminated in order from inside in the tire radial direction, wherein the tread has a plurality of main grooves extending continuously in a tire circumferential direction, wherein the tread comprises a cap rubber layer constituting a tread surface and a base rubber layer adjacent to inside in a tire radial direction of the cap rubber layer, wherein the cap rubber layer and the base rubber layer are composed of a rubber composition comprising a rubber component, wherein the rubber component constituting the cap rubber layer comprises an isoprene-based rubber and a butadiene rubber, wherein the rubber composition constituting the cap rubber layer comprises 30 parts by mass or more of silica having a nitrogen adsorption specific surface area ($N_2$SA) of 180 m²/g or more based on 100 parts by mass of the rubber component, and wherein a tan δ of the rubber composition constituting the base rubber layer at 70° C. is 0.04 to 0.07,

[2] The heavy duty tire of the above [1], wherein, when, in a tire meridional cross section including a tire rotation axis, a thickness of the cap rubber layer on a normal line extending from an end of a tire rotation axis direction of the third belt layer down to the tread surface is Te, a distance from the third belt layer to the tread surface on the normal line is Tt2, a distance from the second belt layer to the tread surface on the normal line is Tt1, a thickness of the cap rubber layer at a position half a distance from a tire equatorial plane to the end of the tire rotation axis direction of the third belt layer is Tm, and a thickness of the cap rubber layer on the tire equatorial plane is Tc, Te, Tt2, Tt1, Tm, and Tc satisfy Mathematical expression (1), (2), (3), and (4) below:

$$0.65 \leq Te/Tt2 \leq 0.75 \tag{1}$$

$$0.60 \leq Te/Tt1 \leq 0.70 \tag{2}$$

$$0.85 \leq Tc/Tm \leq 1.15 \tag{3}$$

$$0.85 \leq Tm/Te \leq 1.15 \tag{4}$$

[3] The heavy duty tire of the above [1] or [2], comprising 8 to 18 parts by mass of a sulfide-based silane coupling agent based on 100 parts by mass of the silica compounded in the rubber composition constituting the cap rubber layer,

[4] The heavy duty tire of any one of the above [1] to [3], wherein the rubber component constituting the cap rubber layer comprises 65% by mass or more of isoprene-based rubber,

[5] The heavy duty tire of any one of the above [1] to [4], wherein the rubber composition constituting the base rubber layer has a modulus of 5.0 to 14.0 at 200% stretching at 23° C.,

[6] The heavy duty tire of any one of the above [1] to [5], wherein an elongation at break of the rubber composition constituting the base rubber layer is 380% or more,

[7] The heavy duty tire of any one of the above [2] to [6], wherein Te is smaller than Tm and Tc,

[8] The heavy duty tire of any one of the above [1] to [7], wherein a ratio of a storage elastic modulus Ec' of the rubber composition constituting the cap rubber layer at 70° C. to a storage elastic modulus Eb' of the rubber composition constituting the base rubber layer at 70° C. (Ec'/Eb') is 1.1 to 1.7,

[9] The heavy duty tire of any one of the above [1] to [8], wherein a ratio of a groove depth Hm of the main groove closest to the tire equatorial plane to a distance Tt3 from the tread surface on the tire equatorial plane to the outermost belt layer in the tire radial direction (Hm/Tt3) is 0.50 to 0.90,

[10] The heavy duty tire of any one of the above [2] to [9], wherein a ratio of Te to a groove depth Hs of the main groove closest to a tread end (Te/Hs) is 0.50 to 0.90,

[11] The heavy duty tire of any one of the above [1] to [10], wherein a ratio of a distance Wb in a tire rotation axis direction from the tire equatorial plane to a groove edge of the main groove closest to the tire equatorial plane to a distance Wa in a tire rotation axis direction from the tire equatorial plane to a layer end of the outermost belt layer in the tire radial direction (Wb/Wa) is 0.50 to 0.90,

[12] The heavy duty tire of any one of the above [1] to [11], wherein the rubber composition constituting the cap rubber layer comprises one or more selected from the group consisting of a phenol resin, a cresol resin, and a resorcin resin.

According to the present invention, provided is a heavy duty tire having improved fuel efficiency, wet grip performance, abrasion resistance, chipping resistance, and tear resistance with good balance.

BRIEF DESCRIPTION OF THE DRAWINGS

FIG. 2 is an enlarged cross-sectional view showing a part of the heavy duty tire of FIG. 1.

DETAILED DESCRIPTION

Figure 1:
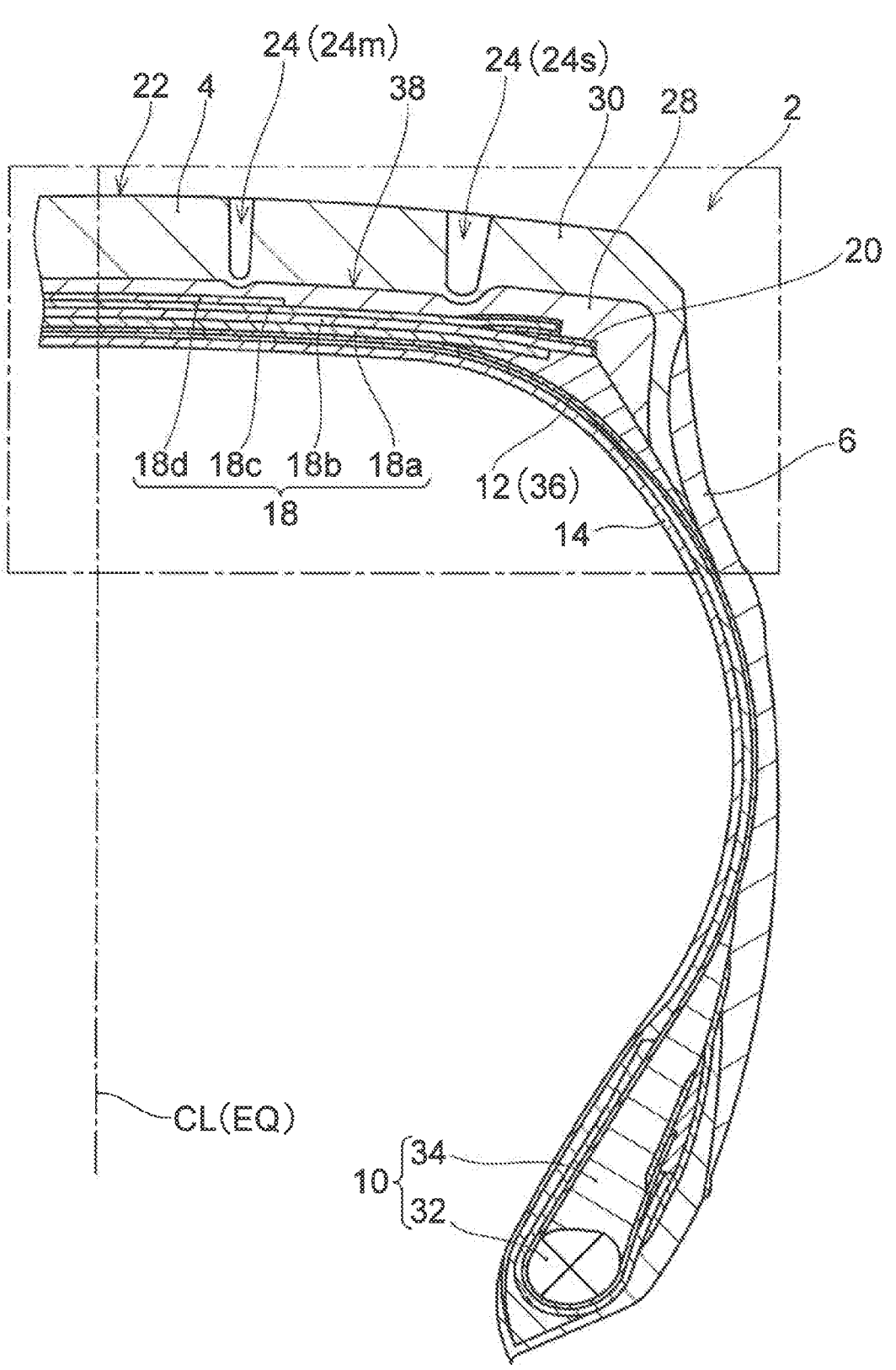
FIG. 1 is a cross-sectional view showing a part of a heavy duty tire according to one embodiment of the present disclosure.

The heavy duty tire according to one embodiment of the present disclosure is a heavy duty tire comprising a carcass extending from a tread part through a sidewall part to a bead core of a bead part and a belt layer arranged outside in a tire radial direction of the carcass and inside of the tread part, wherein the belt layer is formed by a belt ply comprising a first belt layer, a second belt layer, and a third belt layer which are laminated in order from inside in the tire radial direction, wherein the tread has a plurality of main extending continuously in a tire circumferential direction, wherein the tread comprises a cap rubber layer constituting a tread surface and a base rubber layer adjacent to inside in a tire radial direction of the cap rubber layer, wherein the cap rubber layer and the base rubber layer are composed of a rubber composition comprising a rubber component, wherein the rubber component constituting the cap rubber layer comprises an isoprene-based rubber and a butadiene rubber, wherein the rubber composition constituting the cap rubber layer comprises 30 parts by mass or more of silica having a nitrogen adsorption specific surface area ($N_2SA$) of $180 \text{ m}^2/\text{g}$ or more based on 100 parts by mass of the rubber component, and wherein a tan δ of the rubber composition constituting the base rubber layer at 70° C. is 0.04 to 0.07.

Although it is not intended to be bound by theory, in the present disclosure, as a mechanism that can improve fuel efficiency, wet grip performance, abrasion resistance, chipping resistance, and tear resistance of the heavy duty tire with good balance, the following is considered. By setting contents and nitrogen adsorption specific surface areas ($N_2SA$) of the rubber component and silica to be compounded in the cap rubber layer in a predetermined combination, silica can be finely dispersed to a high degree, a strong silica network is formed, and it becomes possible to highly achieve balance of strength and stretching at elongation of the rubber composition. Moreover, by compounding silica in the cap rubber layer, hydrophilicity of the rubber composition becomes improved, and followability to a wet road surface becomes improved. Furthermore, by setting a tan δ of the rubber composition constituting the base rubber layer at 70° C. within a predetermined range, a temperature rise at a belt end can be suppressed, and breaking that starts from a steel filament end can be suppressed, as well as a decrease in breaking strength of the base rubber layer itself can be suppressed. In this way, it is considered that physical properties of the rubber composition constituting each layer of the tread and the tire structure cooperate with each other to allow for improvement in fuel efficiency, wet grip performance, abrasion resistance, chipping resistance, and tear resistance with good balance.

The heavy duty tire of the present disclosure preferably satisfies Mathematical expression (1), (2), (3), and (4) below, when, in a tire meridional cross section including a tire rotation axis, a thickness of the cap rubber layer on a normal line extending from an end of a tire rotation axis direction of the third belt layer down to the tread surface is Te, a distance from the third belt layer to the tread surface on the normal line is Tt2, a distance from the second belt layer to the tread surface on the normal line is Tt1, a thickness of the cap rubber layer at a position half a distance from a tire equatorial plane to the end of the tire rotation axis direction of the third belt layer is Tm, and a thickness of the cap rubber layer on the tire equatorial plane is Tc:

$$0.65 \leq Te/Tt2 \leq 0.75 \tag{1}$$

$$0.60 \leq Te/Tt1 \leq 0.70 \tag{2}$$

$$0.85 \leq Tc/Tm \leq 1.15 \tag{3}$$

$$0.85 \leq Tm/Te \leq 1.15 \tag{4}$$

The cap rubber layer preferably comprises 8 to 18 parts by mass of a sulfide-based silane coupling agent based on 100 parts by mass of the silica compounded in the rubber composition constituting the cap rubber layer.

The rubber component constituting the cap rubber layer preferably comprises 65% by mass or more of isoprene-based rubber.

The modulus of the rubber composition constituting the base rubber layer at 200% stretching at 23° C. is preferably 5.0 to 14.0.

The elongation at break of the rubber composition constituting the base rubber layer is preferably 380% or more.

Te is preferably smaller than Tm and Tc.

The ratio of the storage elastic modulus Ec' of the rubber composition constituting the cap rubber layer at 70° C. to the storage elastic modulus Eb' of the rubber composition constituting the base rubber layer at 70° C. (Ec'/Eb') is preferably 1.1 to 1.7.

The ratio of the groove depth Hm of the main groove closest to the tire equatorial plane to the distance Tt3 from the tread surface on the tire equatorial plane to the outermost belt layer in the tire radial direction (Hm/Tt3) is preferably 0.50 to 0.90.

The ratio of Te to the groove depth Hs of the main groove closest to the tread end (Te/Hs) is preferably 0.50 to 0.90.

The ratio of the distance Wb in the tire rotation axis direction from the tire equatorial plane to the groove edge of the main groove closest to the tire equatorial plane to the distance Wa in the tire rotation axis direction from the tire equatorial plane to the layer end of the outermost belt layer in the tire radial direction (Wb/Wa) is preferably 0.50 to 0.90.

The rubber composition constituting the cap rubber layer preferably comprises one or more selected from the group consisting of a phenol resin, a cresol resin, and a resorcin resin.

The heavy duty tire according to one embodiment of the present disclosure will be described in detail below. However, the following descriptions are illustrative for explaining the present disclosure, and are not intended to limit the technical scope of the present invention to this description range only. Besides, in the present specification, a numerical range identified with "to" means to include the numerical values of both ends.

FIG. 1 is a cross-sectional view showing a part of a heavy duty tire according to one embodiment of the present disclosure. In FIG. 1, a vertical direction is a radial direction of the heavy duty tire 2, a horizontal direction is a tire axial direction of the heavy duty tire 2, and a direction perpendicular to a paper surface is a circumferential direction of the heavy duty tire 2. In FIG. 1, a center line CL of the heavy duty tire 2 also represents an equatorial plane EQ of the heavy duty tire 2. A shape of this heavy duty tire 2 is symmetrical with respect to the equatorial plane EQ, except for a tread pattern.

This heavy duty tire 2 comprises a tread 4, a sidewall 6, a bead 10, a carcass 12, an inner liner 14, and a belt layer 18. The inner liner 14 is located inside the carcass 12. The tread 4 forms a tread surface 22 that is in contact with a road surface. A plurality of main grooves 24 extending continuously in the tire circumferential direction are formed on the tread surface 22.

An outer end of the tread 4 in the tire rotation axis direction and its vicinity are referred to as shoulder parts of the heavy duty tire 2. In the present disclosure, for the sake of clarity, a portion outside in a tire rotation axis direction with respect to a main groove 24s closest to a tread end is referred to as a shoulder part.

The bead 10 comprises a bead core 32 and an apex 34 extending radially outward from this bead core 32. The bead core 32 is ring-shaped and includes a wound non-stretchable wire. The apex 34 is tapered outward in the tire radial direction.

The carcass 12 is composed of a carcass ply 36. The carcass ply 36 spans between the beads 10 on both sides and runs along the tread 4 and the sidewall 6. The carcass ply 36 is folded around the bead core 32 from inside to outside in the tire rotation axis direction. The carcass ply 36 is composed of a large number of cords and topping rubbers arranged in parallel. The carcass 12 may be formed from two or more carcass plies 36.

The belt layer 18 extends in the tire rotation axis direction. The belt layer 18 is located inside the tread 4 in the tire radial direction. The belt layer 18 is located outside in the tire radial direction of the carcass 12 to reinforce the carcass 12.

The belt layer 18 is formed of at least three belt plies including a first belt layer 18a, a second belt layer 18b, and a third belt layer 18c, which are laminated in order from inside in the tire radial direction. FIG. 1 shows a case where a fourth belt layer 18d is arranged outside in the tire radial direction of the third belt layer 18c. The first belt layer 18a is laminated on the carcass 12. In FIG. 1, the second belt layer 18b has the largest width among the four layers described above, and the fourth belt layer 18d has the smallest width among the four layers described above, in the tire rotation axis direction, though the present invention is not limited to such an aspect.

Figure 2:
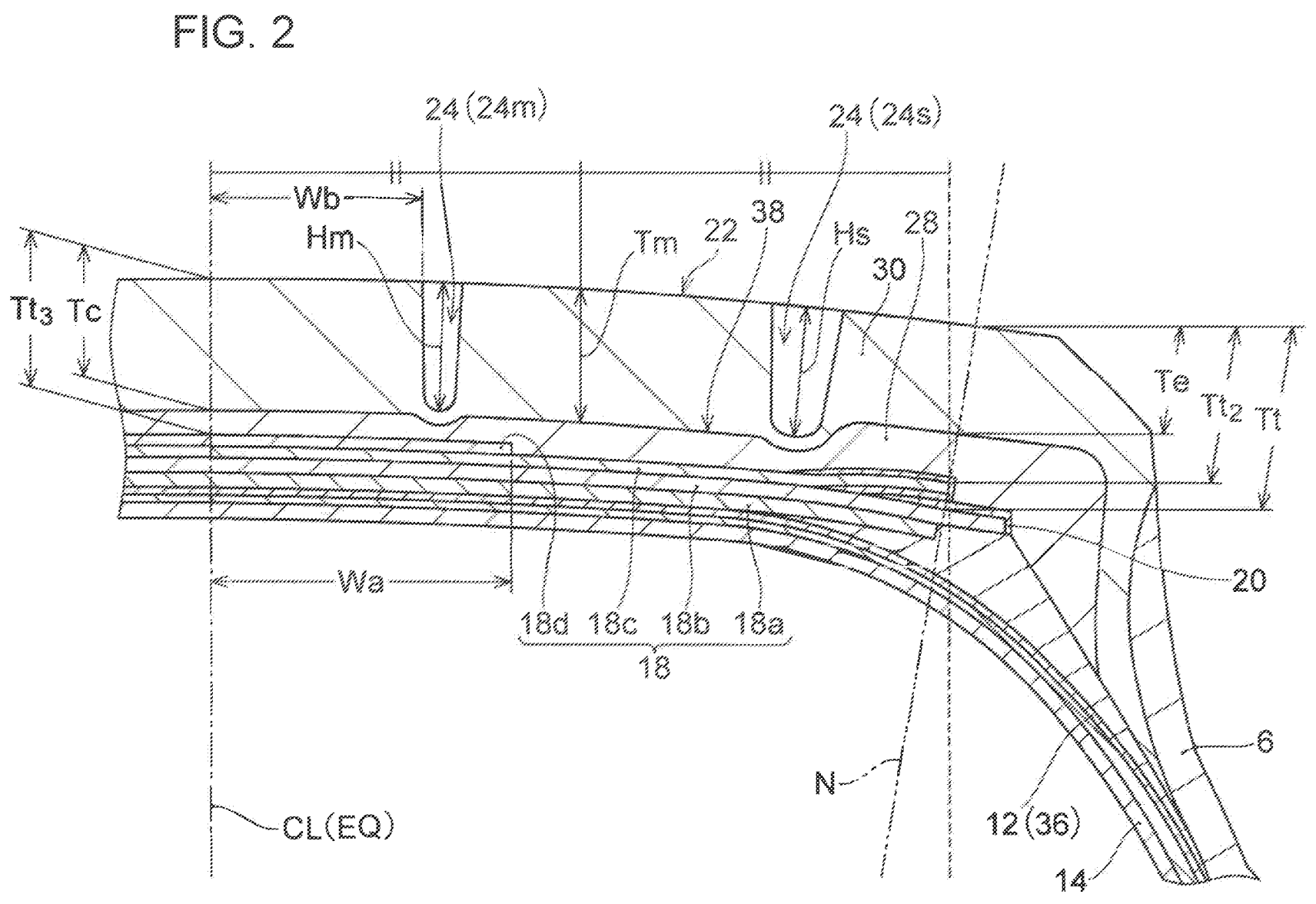

FIG. 2 is an enlarged cross-sectional view showing the vicinity of the shoulder part of the heavy duty tire 2 of FIG. 1. As shown in the figure, a cap rubber layer 30 extends to both outer ends of the tread 4 in the tire rotation axis direction. A covering rubber 20 covers each end of the second belt layer 18b and the third belt layer 18c.

The tread 4 comprises a base rubber layer 28 and a cap rubber layer 30, the outer surface of the cap rubber layer 30 constituting the tread surface 22, and the base rubber layer 28 being adjacent to inside in the tire radial direction of the cap rubber layer 30. Moreover, as long as effects of the present disclosure are achieved, one or more rubber layers may be further provided between the base rubber layer 28 and the belt layer 18.

In the present disclosure, unless otherwise specified, a dimension and an angle of each member of the tire are measured in a state where the tire is incorporated into a normal rim and is filled with air so as to have a normal internal pressure. At the time of measurement, no load is applied to the tire. Besides, herein, a "normal rim" is a rim defined for each tire in a standard system including standards, on which the tire is based, by the standard, for example, a "standard rim" for JATMA, "Design Rim" for TRA, or "Measuring Rim" for ETRTO. A "normal internal pressure" herein is an air pressure defined for each tire by the standards, i.e., a "maximum air pressure" for JATMA, a maximum value described in Table "TIRE LOAD LIMITS AT VARIOUS COLD INFLATION PRESSURES" for TRA, or "INFLATION PRESSURE" for ETRTO.

The heavy duty tire of the present disclosure preferably satisfies Mathematical expression (1), (2), (3), and (4) below, when, in a tire meridional cross section including a tire rotation axis, a thickness of the cap rubber layer 30 on a normal line N extending from an end of a tire rotation axis direction of the third belt layer down to the tread surface 22 is Te, a distance from the third belt layer to the tread surface 22 on the normal line N is Tt2, a distance from the second belt layer to the tread surface 22 on the normal line N is Tt1, a thickness of the cap rubber layer 30 at a position half a distance from a tire equatorial plane EQ to the end of the tire rotation axis direction of the third belt layer is Tm, and a thickness of the cap rubber layer 30 on the tire equatorial plane EQ is Tc. Besides, the normal line N is a line that passes through the end of the tire rotation axis direction of the outer surface in the tire radial direction of the third belt layer and is perpendicular to a tangent line at the end of the tire rotation axis direction.

$$0.65 \leq Te/Tt2 \leq 0.75 \qquad (1)$$

$$0.60 \leq Te/Tt1 \leq 0.70 \qquad (2)$$

$$0.85 \leq Tc/Tm \leq 1.15 \qquad (3)$$

$$0.85 \leq Tm/Te \leq 1.15 \qquad (4)$$

When Te/Tt2 is less than 0.65, it becomes difficult to secure a sufficient volume of the cap rubber layer 30 to exhibit abrasion resistance and chipping resistance of the cap rubber layer 30 at the late period of tire abrasion, and further, at the end period of tire abrasion, the base rubber layer 28 becomes easily exposed on the tire surface, and thus tendencies of shortening of the tire life and occurrence of uneven abrasion can be seen. On the other hand, when Te/Tt2 exceeds 0.75, a volume of the base rubber layer 28 in the shoulder part is insufficient, and therefore a temperature during running from the end of the tire rotation axis direction of the second belt layer to the vicinity of the end of the tire rotation axis direction of the third belt layer becomes easily increased, and an effect of suppressing adhesive failure at the end of the tire rotation axis direction of the third belt layer with a steel filament and a rubber becomes reduced. The adhesive failure at the end of the tire rotation axis direction of the third belt layer becomes breakage inside the rubber between the second belt layer and the third belt layer and proceeds toward the tire equatorial plane, which may result in damage to the entire tire. Moreover, for the same reason, Te and Tt1 preferably satisfy the above-described inequality (2).

Furthermore, Te, Tt1, and Tt2 preferably satisfy Mathematical expression (5) below.

$$0.20 \leq (Te/Tt2)-(Te/Tt1) \leq 0.70 \qquad (5)$$

When (Te/Tt2)−(Te/Tt1) is less than 0.20, a shear between the end of the tire rotation axis direction of the second belt layer and the end of the tire rotation axis direction of the third belt layer along with a change in shape of the tread part during running becomes difficult to be reduced, and therefore there is a tendency to become difficult to suppress the breakage mentioned above. When $(Te/Tt2)-(Te/Tt1)$ exceeds 0.70, a distance between the end of the tire rotation axis direction of the second belt layer and the end of the tire rotation axis direction of the third belt layer becomes too large, and therefore there is a tendency to become difficult to maintain a proper tread shape.

A thickness distribution of the cap rubber layer 30 preferably satisfies Mathematical expression (3) and (4) above from the viewpoint of tire performance balance after the late period of abrasion.

The ratio of the groove depth Hm of the main groove 24*m* closest to the tire equatorial plane to the distance Tt3 from the tread surface on the tire equatorial plane to the outermost belt layer (the fourth belt layer 18*d* in FIG. 1) in the tire radial direction (Hm/Tt3) is preferably 0.50 or more, more preferably 0.55 or more, further preferably 0.60 or more. Moreover, Hm/Tt3 is preferably 0.90 or less, more preferably 0.85 or less, further preferably 0.80 or less. By setting Hm/Tt3 within the above-described ranges, chipping resistance can be further improved.

The ratio of Te to the groove depth Hs of the main groove 24*s* closest to the tread end (Te/Hs) is preferably 0.50 or more, more preferably 0.55 or more, further preferably 0.60 or more. Moreover, Te/Hs is preferably 0.90 or less, more preferably 0.85 or less, further preferably 0.80 or less. Furthermore, Te is preferably smaller than Tm and Tc. By arranging a base rubber layer 28 with low heat generation on a shoulder part 26 which is a portion having a large strain and a large heat generation, heat generation of the entire tread 4 can be reduced, and therefore a volume of the base rubber layer 28 in the vicinity of the tire equatorial plane can be reduced, and accordingly, it becomes possible to suppress a situation where the base rubber layer 28 comes into contact with the road surface at the end period of abrasion and maintain chipping resistance.

The ratio of the distance Wb in the tire rotation axis direction from the tire equatorial plane to the groove edge of the main groove closest to the tire equatorial plane to the distance Wa in the tire rotation axis direction from the tire equatorial plane to the layer end of the outermost belt layer (the fourth belt layer 18*d* in FIG. 1) in the tire radial direction (Wb/Wa) is preferably 0.50 or more, more preferably 0.55 or more, further preferably 0.60 or more. Moreover, Wb/Wa is preferably 0.90 or less, more preferably 0.85 or less, further preferably 0.80 or less. By setting Wb/Wa within the above-described ranges, chipping resistance can be further improved.

"70° C. E'" in the present disclosure refers to a storage elastic modulus (MPa) δ under a condition of a temperature at 70° C., an initial strain of 10%, a dynamic strain of ±2%, and a frequency of 10 Hz. The ratio of the storage elastic modulus Ec' of the rubber composition constituting the cap rubber layer 30 at 70° C. to the storage elastic modulus Eb' of the rubber composition constituting the base rubber layer 28 at 70° C. (Ec'/Eb) is preferably 1.1 to 1.7, more preferably 1.1 to 1.6, further preferably 1.2 to 1.5, particularly preferably 1.2 to 1.4, from the viewpoint of chipping resistance. The 70° C. E' of the rubber composition constituting the cap rubber layer 30 is preferably 4.4 to 11.0 MPa, more preferably 5.4 to 10.0 MPa, further preferably 6.0 to 9.5 MPa. Moreover, the 70° C. E' of the rubber composition constituting the base rubber layer 28 is preferably 4.0 to 6.5 MPa, more preferably 4.5 to 6.3 MPa, further preferably 5.0 to 6.1

MPa. Besides, the 70° C. E' of each rubber layer can be appropriately adjusted depending on types and compounding amounts of the above-described rubber component, filler, silane coupling agent, softening agent, and the like.

The "70° C. tan δ" in the present disclosure refers to a loss tangent tan δ under a condition of a temperature at 70° C., an initial strain of 10%, a dynamic strain of ±2%, and a frequency of 10 Hz. The 70° C. tan δ of the rubber composition constituting the base rubber layer 28 is 0.04 or more, preferably 0.05 or more. When the 70° C. tan δ of the rubber composition constituting the base rubber layer 28 is less than 0.04, breaking strength in compounding itself of the base rubber is remarkably lowered, and there is a concern that tears may occur due to the breaking of the base rubber itself. On the other hand, the 70° C. tan δ of the rubber composition constituting the base rubber layer 28 is 0.07 or less, preferably 0.06 or less, from the viewpoints of suppressing a temperature rise at the belt end and suppressing a breaking starting from a steel filament end. Moreover, a value of the 70° C. tan δ of the rubber composition constituting the cap rubber layer 30 is preferably larger than a value of the 70° C. tan δ of the rubber composition constituting the base rubber layer 28, from the viewpoint of well exhibiting an effect of improving fuel efficiency. Besides, the 70° C. tan δ of each rubber layer can be appropriately adjusted depending on types and compounding amounts of the above-described rubber component, filler, silane coupling agent, softening agent, and the like.

The modulus at 200% stretching in the present disclosure refers to a tension stress at 100% stretching in a columnar direction measured under a condition of a tensile speed of 3.3 mm/sec in an atmosphere of 23° C. according to JIS K 6251: 2017. The modulus at 200% stretching of the base rubber layer 28 is preferably 5.0 MPa or more, more preferably 5.5 MPa or more, further preferably 6.0 MPa or more, particularly preferably 6.5 MPa or more, from the viewpoints of ensuring rigidity of the tread part and suppressing uneven abrasion. On the other hand, the modulus at 200% stretching of the base rubber layer 28 is preferably 14.0 MPa or less, more preferably 13.5 MPa or less, further preferably 13.0 MPa or less, particularly preferably 12.5 MPa or less. When the modulus at 200% stretching of the base rubber layer 28 exceeds 14.0 MPa, it is difficult to let an external force escape, and an input is concentrated at an interface between the cap rubber layer 30 and the base rubber layer 28, so that there is a concern that a crack growth may occur at the interface. Moreover, the modulus at 200% stretching of the cap rubber layer 30 is preferably larger than that at 200% stretching of the base rubber layer 28. Besides, in the present specification, a "columnar direction" means a rolling direction at the time of forming a rubber sheet by extrusion or shearing.

The elongation at break (EB) in the present disclosure refers to an elongation at break (elongation at cutting) measured under a condition of a tensile speed of 3.3 mm/sec in an atmosphere of 23° C. according to JIS K 6251: 2017. The EB of the cap rubber layer 30 is preferably 400% or more, more preferably 420% or more, from the viewpoint of maintaining smoothness of the surface. Moreover, the EB of the base rubber layer 28 is preferably 380% or more, more preferably 400% or more, from the viewpoint of suppressing breakage inside the rubber between the second belt layer 18*b* and the third belt layer 18*c*. Besides, an upper limit of the EB of the rubber compositions constituting the cap rubber layer 30 and the base rubber layer 28 is not particularly limited.

Besides, the modulus at 200% stretching and the EB of each rubber layer can be appropriately adjusted depending on types and compounding amounts of the above-described rubber component, filler, silane coupling agent, softening agent, and the like.

[Rubber Composition]

The heavy duty tire of the present disclosure can be improved in fuel efficiency, wet grip performance, abrasion resistance, chipping resistance, and tear resistance with good balance by cooperating the tire structure mentioned above with the above-described physical properties of the rubber composition constituting each layer of the tread.

<Rubber Component>

The rubber composition constituting each rubber layer of the tread (the rubber composition for tread) according to the present disclosure preferably comprises at least one selected from the group consisting of an isoprene-based rubber, a styrene-butadiene rubber (SBR), and a butadiene rubber (BR) as rubber components. The rubber component constituting the cap rubber layer 30 comprises an isoprene-based rubber and a BR, and may be a rubber component consisting only of an isoprene-based rubber and a BR. The rubber component constituting the base rubber layer 28 preferably comprises an isoprene-based rubber, and may be a rubber component consisting only of an isoprene-based rubber.

(Isoprene-Based Rubber)

As an isoprene-based rubber, for example, those common in the tire industry can be used, such as an isoprene rubber (IR) and a natural rubber. Examples of the natural rubber includes a non-modified natural rubber (NR), as well as a modified natural rubber such as an epoxidized natural rubber (ENR), a hydrogenated natural rubber (HNR), a deproteinized natural rubber (DPNR), an ultra pure natural rubber (UPNR), and a grafted natural rubber, and the like. These isoprene-based rubbers may be used alone or two or more thereof may be used in combination.

The NR is not particularly limited, and those common in the tire industry can be used, examples of which include, for example, SIR20, RSS #3, TSR20, and the like.

In the rubber composition constituting the cap rubber layer 30, a content of the isoprene-based rubber in the rubber component is preferably 50% by mass or more, more preferably 55% by mass or more, further preferably 60% by mass or more, particularly preferably 65% by mass or more. Since silica has a good affinity with an isoprene-based rubber, strength of the entire matrix is improved by increasing the content of the isoprene-based rubber in the rubber component and dispersing silica in an isoprene-based rubber phase which becomes a sea phase, and therefore abrasion resistance and fracture characteristics tend to be further improved. On the other hand, it is preferably 95% by mass or less, more preferably 90% by mass or less, further preferably 85% by mass or less, particularly preferably 80% by mass or less, from the viewpoint of wet grip performance.

In the rubber composition constituting the base rubber layer 28, the content of the isoprene-based rubber in the rubber component is preferably 85% by mass or more, more preferably 90% by mass or more, further preferably 95% by mass or more, and the rubber component may consist only of an isoprene-based rubber.

(BR)

The BR is not particularly limited, and those common in the tire industry can be used such as, for example, a BR having a cis content of less than 50% (a low cis BR), a BR having a cis content of 90% or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). These BRs may be used alone or two or more thereof may be used in combination.

As a high cis BR, for example, those commercially available from Zeon Corporation, Ube Industries, Ltd., JSR Corporation, etc. can be used. When the high cis BR is compounded, abrasion resistance can be improved. The cis content is preferably 95% or more, more preferably 96% or more, further preferably 97% or more, particularly preferably 98% or more. Besides, in the present specification, the cis content (cis-1,4-bond butadiene unit amount) is a value calculated by infrared absorption spectrometry.

As a rare-earth-based BR, those which are synthesized using a rare-earth element-based catalyst, have a vinyl content of preferably 1.8 mol % or less, more preferably 1.0 mol % or less, further preferably 0.8% mol or less and a cis content of preferably 95% or more, more preferably 96% or more, further preferably 97% or more, particularly preferably 98% or more, can be used. As a rare-earth-based BR, for example, those commercially available from LANXESS, etc. can be used.

Examples of the SPB-containing BR include those in which 1,2-syndiotactic polybutadiene crystal is chemically bonded with BR and dispersed, but not those in which crystal is simply dispersed in the BR. As such SPB-containing BR, those commercially available from Ube Industries, Ltd., etc. can be used.

Examples of modified BRs include those obtained by adding a tin compound after polymerizing 1,3-butadiene by a lithium initiator, the end of which is further bonded by tin-carbon bond (a tin-modified BR), a butadiene rubber having condensed alkoxysilane compound at its active end, and the like. Examples of such modified BRs include, for example, BR1250H (tin-modified) manufactured by ZS Elastomer Co., Ltd., an S-modified polymer (modified for silica), and the like.

A weight-average molecular weight (Mw) of the BR is preferably 300,000 or more, more preferably 350,000 or more, further preferably 400,000 or more, from the viewpoints of abrasion resistance and grip performance, etc. Moreover, it is preferably 2,000,000 or less, more preferably 1,000,000 or less, from the viewpoints of cross-linking uniformity, etc. Besides, the Mw can be calculated in terms of a standard polystyrene based on measurement values obtained by a gel permeation chromatography (GPC) (e.g., GPC-8000 Series manufactured by Tosoh Corporation, detector: differential refractometer, column: TSKGEL SUPERMULTIPORE HZ-M manufactured by Tosoh Corporation).

A content of the BR in the rubber component is preferably 5% by mass or more, more preferably 10% by mass or more, further preferably 15% by mass or more, particularly preferably 20% by mass or more, from the viewpoint of abrasion resistance. Moreover, it is preferably 40% by mass or less, more preferably 35% by mass or less, further preferably 30% by mass or less, particularly preferably 25% by mass or less, from the viewpoint of wet grip performance.

(SBR)

The SBR is not particularly limited, examples of which include a solution-polymerized SBR (S-SBR), an emulsion-polymerized SBR (E-SBR), modified SBRs (a modified S-SBR, a modified E-SBR) thereof, and the like. Examples of the modified SBR include a SBR modified at its terminal and/or main chain, a modified SBR coupled with tin, a silicon compound, etc. (a modified SBR of condensate or having a branched structure, etc.), and the like. Among them, an E-SBR is preferable from the viewpoint that it can well improve fuel efficiency and abrasion resistance. These SBRs may be used alone or two or more thereof may be used in combination.

(Other Rubber Components)

As the rubber components according to the present disclosure, rubber components other than the above-described isoprene-based rubbers, SBRs, and BRs may be compounded. As other rubber components, cross-linkable rubber components commonly used in the tire industry can be used, such as, for example, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydride nitrile rubber (HNBR), a butyl rubber (IIR), an ethylene propylene rubber, a polynorbornene rubber, a silicone rubber, a polyethylene chloride rubber, a fluororubber (FKM), an acrylic rubber (ACM), a hydrin rubber, and the like. These other rubber components may be used alone, or two or more thereof may be used in combination.

(Filler)

The rubber composition for tread according to the present disclosure preferably comprises a filler comprising carbon black and/or silica. Moreover, the filler may be a filler consisting only of carbon black and silica. The rubber composition constituting the cap rubber layer 30 preferably comprises silica as a filler, more preferably comprises carbon black and silica, and may comprise a filler consisting only of carbon black and silica. The rubber composition constituting the base rubber layer 28 preferably comprises carbon black as a filler, more preferably comprises carbon black and silica, and may comprise a filler consisting only of carbon black and silica.

(Silica)

When the rubber composition for tread according to the present disclosure comprises silica, fuel efficiency, wet grip performance, abrasion resistance, and chipping resistance can be improved. Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. These silica may be used alone or two or more thereof may be used in combination.

A nitrogen adsorption specific surface area (N$_2$SA) of the silica is 180 m$^2$/g or more, preferably 185 m$^2$/g or more, more preferably 190 m$^2$/g or more, further preferably 200 m$^2$/g or more, from the viewpoints of abrasion resistance and fracture characteristics. Moreover, it is preferably 350 m$^2$/g or less, more preferably 300 m$^2$/g or less, further preferably 250 m$^2$/g or less, from the viewpoints of fuel efficiency and processability. Besides, the N$_2$SA of silica in the present specification is a value measured by a BET method according to ASTM D3037-93.

The rubber composition constituting the cap rubber layer 30 comprises 30 parts by mass or more of silica based on 100 parts by mass of the rubber component from the viewpoint of balance of fuel efficiency and wet grip performance. In the rubber composition constituting the cap rubber layer 30, a content of silica based on 100 parts by mass of the rubber component is preferably 35 parts by mass or more, more preferably 40 parts by mass or more, further preferably 45 parts by mass or more. Moreover, it is preferably 150 parts by mass or less, more preferably 130 parts by mass or less, further preferably 110 parts by mass or less, from the viewpoint of suppressing deterioration of fuel efficiency and abrasion resistance due to deterioration of silica dispersibility in a rubber.

In the rubber composition constituting the base rubber layer 28, the content of silica based on 100 parts by mass of the rubber component is preferably 1 part by mass or more, more preferably 3 parts by mass or more, further preferably 5 parts by mass or more. Moreover, it is preferably 60 parts by mass or less, more preferably 50 parts by mass or less, further preferably 40 parts by mass or less, particularly preferably 30 parts by mass or less, from the viewpoints of fuel efficiency and abrasion resistance.

(Carbon Black)

Carbon black is not particularly limited, and, for example, those commonly used in the tire industry such as GPF, FEF, HAF, ISAF, and SAF can be used. These carbon black may be used alone or two or more thereof may be used in combination.

A nitrogen adsorption specific surface area (N$_2$SA) of the carbon black is preferably 50 m$^2$/g or more, more preferably 80 m$^2$/g or more, further preferably 100 m$^2$/g or more, from the viewpoints of weather resistance and reinforcing property. Moreover, it is preferably 250 m$^2$/g or less, more preferably 220 m$^2$/g or less, from the viewpoints of dispersibility, fuel efficiency, fracture characteristics, and durability. Besides, the N$_2$SA of carbon black in the present specification is a value measured according to JIS K 6217-2: "Carbon black for rubber industry-Fundamental characteristics-Part 2: Determination of specific surface area-Nitrogen adsorption methods-Single-point procedures" A Method.

In the rubber composition constituting the cap rubber layer 30, a content of carbon black based on 100 parts by mass of the rubber component is preferably 1 part by mass or more, more preferably 3 parts by mass or more, further preferably 5 parts by mass or more, from the viewpoints of weather resistance and reinforcing property. Moreover, it is preferably 60 parts by mass or less, more preferably 50 parts by mass or less, further preferably 40 parts by mass or less, particularly preferably 30 parts by mass or less, from the viewpoint of fuel efficiency.

In the rubber composition constituting the base rubber layer 28, the content of carbon black based on 100 parts by mass of the rubber component is preferably 5 parts by mass or more, more preferably 15 parts by mass or more, further preferably 25 parts by mass or more, from the viewpoint of reinforcing property. Moreover, it is preferably 60 parts by mass or less, more preferably 50 parts by mass or less, further preferably 40 parts by mass or less, from the viewpoint of fuel efficiency.

As fillers other than silica and carbon black, those commonly used in the tire industry such as, for example, aluminum hydroxide, calcium carbonate, alumina, clay, and talc, can be used.

In the rubber composition constituting the cap rubber layer 30, a content of silica in a total of 100% by mass of silica and carbon black is preferably 40% by mass or more, more preferably 50% by mass or more, further 55% by mass or more, particularly preferably 60% by mass or more. Moreover, the content of silica is preferably 99% by mass or less, more preferably 97% by mass or less, further preferably 95% by mass or less.

In the rubber composition constituting the base rubber layer 28, the content of silica in the total 100% by mass of silica and carbon black is preferably 5% by mass or more, more preferably 10% by mass or more. Moreover, the content of silica is preferably 30% by mass or less, more preferably 25% by mass or less.

In the rubber composition constituting the cap rubber layer 30, a total content of silica and carbon black based on 100 parts by mass of the rubber component is preferably 40 parts by mass or more, more preferably 50 parts by mass or more, further preferably 55 parts by mass or more, from the viewpoint of abrasion resistance. Moreover, it is preferably 180 parts by mass or less, more preferably 160 parts by mass or less, further preferably 140 parts by mass or less, from the viewpoint of suppressing deterioration of fuel efficiency and abrasion resistance.

In the rubber composition constituting the base rubber layer 28, the total content of silica and carbon black based on 100 parts by mass of the rubber component is preferably 20 parts by mass or more, more preferably 30 parts by mass or more, further preferably 40 parts by mass or more. Moreover, the content is preferably 70 parts by mass or less, more preferably 60 parts by mass or less, further preferably 50 parts by mass or less.

(Silane Coupling Agent)

Silica is preferably used in combination with a silane coupling agent. The silane coupling agent is not particularly limited, and silane coupling agents conventionally used in combination with silica in the tire industry can be used, examples of which include, for example, mercapto-based silane coupling agents such as 3-mercaptopropyltrimethoxysilane, NXT-Z100, NXT-Z45, and NXT manufactured by Momentive Performance Materials; sulfide-based silane coupling agents such as bis(3-triethoxysilylpropyl)disulfide and bis(3-triethoxysilylpropyl)tetrasulfide; thioester-based silane coupling agents such as 3-octanoylthio-1-propyltriethoxysilane, 3-hexanoylthio-1-propyltriethoxysilane, and 3-octanoylthio-1-propyltrimethoxysilane; vinyl-based silane coupling agents such as vinyltriethoxysilane and vinyltrimethoxysilane; amino-based silane coupling agents such as 3-aminopropyltriethoxysilane, 3-aminopropyltrimethoxysilane, and 3-(2-aminoethyl)aminopropyltriethoxysilane; glycydoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; chloro-based silane coupling agents such as 3-chloropropyltrimethoxysilane and 3-chloropropyltriethoxysilane; and the like. Among them, sulfide-based silane coupling agents and/or mercapto-based silane coupling agents are preferable, and sulfide-based silane coupling agents are more preferable. These silane coupling agents may be used alone or two or more thereof may be used in combination.

A content of the silane coupling agent (preferably the sulfide-based silane coupling agent) based on 100 parts by mass of the rubber component is preferably 0.5 parts by mass or more, more preferably 1.0 part by mass or more, further preferably 2.0 parts by mass or more, particularly preferably 4.0 parts by mass or more, from the viewpoint of enhancing dispersibility of silica. Moreover, it is preferably 20 parts by mass or less, more preferably 15 parts by mass or less, further preferably 10 parts by mass or less, from the viewpoint of preventing deterioration of abrasion resistance.

A content of the silane coupling agent (preferably the sulfide-based silane coupling agent) based on 100 parts by mass of the silica is preferably 1 part by mass or more, more preferably 3 parts by mass or more, further preferably 5 parts by mass or more, particularly preferably 8 parts by mass or more, from the viewpoint of enhancing dispersibility of silica. Moreover, it is preferably 20 parts by mass or less, more preferably 18 parts by mass or less, further preferably 16 parts by mass or less, from the viewpoints of cost and processability.

(Other Compounding Agents)

The rubber composition according to the present disclosure can appropriately comprise compounding agents conventionally and generally used in the tire industry, for example, a softening agent, wax, processing aid, stearic acid, zinc oxide, an antioxidant, a vulcanizing agent, a vulcanization accelerator, and the like, in addition to the above-described components.

Examples of the softening agent include, for example, a resin component, oil, a liquid rubber, and the like.

The resin component is not particularly limited, and examples of which include a petroleum resin, a terpene-based resin, a rosin-based resin, a phenol resin-based, a cresol resin, a resorcin resin, and the like, which are commonly used in the tire industry. Among them, one or more selected from the group consisting of a phenol-based resin, a cresol resin, and a resorcinol resin are preferable. These resin components may be used alone or two or more thereof may be used in combination.

Examples of the phenol-based resin include, but not particularly limited to, a phenol formaldehyde resin, an alkylphenol formaldehyde resin, an alkylphenol acetylene resin, an oil-modified phenol formaldehyde resin, and the like.

When the rubber composition comprises the resin component, the content thereof is, from the viewpoint of wet grip performance, preferably 1 part by mass or more, more preferably 3 parts by mass or more, further preferably 5 parts by mass or more based on 100 parts by mass of the rubber component. Moreover, it is preferably 60 parts by mass or less, more preferably 50 parts by mass or less, further preferably 40 parts by mass or less, particularly preferably 30 parts by mass or less, from the viewpoint of suppressing heat generation.

Examples of oil include, for example, process oil, vegetable fats and oils, animal fats and oils, and the like. Examples of the process oil include a paraffin-based process oil, a naphthene-based process oil, an aroma-based process oil, and the like. Moreover, as an environmental measure, process oil having a low content of a polycyclic aromatic (PCA) compound can also be used. Examples of the low PCA content process oil include a mild extraction solution (MES), a treated distillate aromatic extract (TDAE), a heavy naphthenic oil, and the like.

When the rubber composition comprises the oil, the content thereof is, from the viewpoint of processability, preferably 5 parts by mass or more, more preferably 10 parts by mass or more, further preferably 15 parts by mass or more based on 100 parts by mass of the rubber component. Moreover, it is preferably 120 parts by mass or less, more preferably 100 parts by mass or less, further preferably 90 parts by mass or less, from the viewpoint of abrasion resistance. Besides, in the present specification, the content of oil also includes an amount of oil compounded in an oil-extended rubber.

The liquid rubber is not particularly limited as long as it is a polymer in a liquid state at a normal temperature (25° C.), examples of which include, for example, a liquid butadiene rubber (a liquid BR), a liquid styrene-butadiene rubber (a liquid SBR), a liquid isoprene rubber (a liquid IR), a liquid styrene-isoprene rubber (a liquid SIR), a liquid farnesene rubber, and the like. These liquid rubbers may be used alone or two or more thereof may be used in combination.

When the rubber composition comprises the liquid rubber, the content thereof is preferably 1 part by mass or more, more preferably 2 parts by mass or more, further preferably 3 parts by mass or more, particularly preferably 5 parts by mass or more based on 100 parts by mass of the rubber component. Moreover, the content of the liquid rubber is preferably 50 parts by mass or less, more preferably 40 parts by mass or less, further preferably 20 parts by mass or less.

When the rubber composition comprises the wax, the content thereof is, from the viewpoint of weather resistance of a rubber, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of preventing whitening of a tire due to bloom.

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. These processing aid may be used alone or two or more thereof may be used in combination. As processing aid, for example, those commercially available from Schill+Seilacher GmbH, Performance Additives, etc. can be used.

When the rubber composition comprises the processing aid, the content thereof is, from the viewpoint of exhibiting an effect of improving processability, preferably 0.5 parts by mass or more, more preferably 1 part by mass or more based on 100 parts by mass of the rubber component. Moreover, it is preferably 10 parts by mass or less, more preferably 8 parts by mass or less, from the viewpoints of abrasion resistance and breaking strength.

Examples of the antioxidant include, but not particularly limited to, for example, each amine-based, quinoline-based, quinone-based, phenol-based, and imidazole-based compound, and antioxidants such as a carbamic acid metal salt, preferably, phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, and quinoline-based antioxidants such as 2,2,4-trimethyl-1,2-dihydroquinoline polymer and 6-ethoxy-2,2,4-trimethyl-1,2-dihydroquinoline. These antioxidants may be used alone or two or more thereof may be used in combination.

When the rubber composition comprises the antioxidant, the content thereof is, from the viewpoint of ozone crack resistance of a rubber, preferably 0.5 parts by mass or more, more preferably 1 part by mass or more based on 100 parts by mass of the rubber component. Moreover, it is preferably 10 parts by mass or less, more preferably 5 parts by mass or less, from the viewpoints of abrasion resistance and wet grip performance.

When the rubber composition comprises stearic acid, the content thereof is, from the viewpoint of processability, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of vulcanization rate.

When the rubber composition comprises zinc oxide, the content thereof is, from the viewpoint of processability, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of abrasion resistance.

Sulfur is appropriately used as a vulcanizing agent. As sulfur, powdery sulfur, oil processing sulfur, precipitated sulfur, colloidal sulfur, insoluble sulfur, highly dispersible sulfur, and the like can be used.

When the rubber composition comprises the sulfur as a vulcanizing agent, the content thereof is, from the viewpoint of securing a sufficient vulcanization reaction, preferably 0.1 parts by mass or more, more preferably 0.3 parts by mass or more, further preferably 0.5 parts by mass or more based on 100 parts by mass of the rubber component. Moreover, it is preferably 5.0 parts by mass or less, more preferably 4.0 parts by mass or less, further preferably 3.0 parts by mass or less, from the viewpoint of preventing deterioration. Besides, a content of the vulcanizing agent when an oil-comprising sulfur is used as the vulcanizing agent shall be a total content of pure sulfur comprised in the oil-comprising sulfur.

Examples of vulcanizing agents other than sulfur include, for example, alkylphenol/sulfur chloride condensate, 1,6-hexamethylene-sodium dithiosulfate/dihydrate, 1,6-bis(N, N'-dibenzylthiocarbamoyldithio)hexane, and the like. As these vulcanizing agents other than sulfur, those commercially available from Taoka Chemical Co., Ltd., LANXESS, Flexsys, etc. can be used.

Examples of the vulcanization accelerator include, for example, sulfenamide-based, thiazole-based, thiuram-based, thiourea-based, guanidine-based, dithiocarbamic acid-based, aldehyde-amine-based or aldehyde-ammonia-based, imidazoline-based, and xantate-based vulcanization accelerators, and the like. These vulcanization accelerators may be used alone or two or more thereof may be used in combination. Among them, one or more vulcanization accelerators selected from the group consisting of sulfenamide-based, guanidine-based, and thiazole-based vulcanization accelerators are preferable.

Examples of the sulfenamide-based vulcanization accelerator include, for example, N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and the like. Among them, N-tert-butyl-2-benzothiazolylsulfenamide (TBBS) is preferable.

Examples of the guanidine-based vulcanization accelerator include, for example, 1,3-diphenylguanidine (DPG), 1,3-di-o-tolylguanidine, 1-n-tolylbiguanide, di-o-tolylguanidine salt of dicatecholborate, 1,3-di-o-cumenylguanidine, 1,3-di-o-biphenylguanidine, 1,3-di-o-cumenyl-2-propionylguanidine, and the like. Among them, 1,3-diphenylguanidine (DPG) is preferable.

Examples of the thiazole-based vulcanization accelerator include, for example, 2-mercaptobenzothiazole, cyclohexylamine salt of 2-mercaptobenzothiazole, di-2-benzothiazolyl disulfide, and the like. Among them, 2-mercaptobenzothiazole is preferable.

When the rubber composition comprises the vulcanization accelerator, the content thereof is preferably 1 part by mass or more, more preferably 2 parts by mass or more based on 100 parts by mass of the rubber component. Moreover, the content of the vulcanization accelerator based on 100 parts by mass of the rubber component is preferably 8 parts by mass or less, more preferably 7 parts by mass or less, further preferably 6 parts by mass or less. When the content of the vulcanization accelerator is within the above-described ranges, breaking strength and elongation tend to be secured.

The rubber composition according to the present disclosure can be produced by a known method. For example, it can be produced by kneading each of the above-described components using a rubber kneading apparatus such as an open roll and a closed type kneader (Bunbury mixer, kneader, etc.).

The kneading step includes, for example, a base kneading step of kneading compounding agents and additives other than vulcanizing agents and vulcanization accelerators and a final kneading (F kneading) step of adding vulcanizing agents and vulcanization accelerators to the kneaded product obtained by the base kneading step and kneading them. Furthermore, the base kneading step can be divided into a plurality of steps, if desired.

Examples of a kneading condition include, but not particularly limited to, for example, in the base kneading step, a method of kneading at a discharge temperature at 150 to 170° C. for 3 to 10 minutes, and in the final kneading step, a method of kneading at 70 to 110° C. for 1 to 5 minutes. Examples of a vulcanization condition include, but not particularly limited to, for example, a method of vulcanizing at 150 to 200° C. for 10 to 30 minutes.

[Tire]

A heavy duty tire comprising a tread comprising a cap rubber layer 30 and a base rubber layer 28 can be manufactured by a usual method using the above-described rubber composition. That is, the heavy duty tire can be manufactured by extruding unvulcanized rubber compositions, obtained by compounding each of the above-described components based on the rubber component as necessary, into shapes of the cap rubber layer 30 and the base rubber layer 28 with an extruder equipped with a mouthpiece having a predetermined shape, attaching them together with other tire members on a tire forming machine, and molding them by a usual method, forming an unvulcanized tire, followed by heating and pressurizing this unvulcanized tire in a vulcanizing machine.

Since the heavy duty tire according to the present disclosure is good in abrasion resistance and chipping resistance, it is suitable for running on an off road surface (unpaved rough road surface).

EXAMPLE

Hereinafter, the present disclosure will be described based on Examples, though the present disclosure is not limited to these Examples.

Various chemicals used in Examples and Comparative examples are collectively shown below.

NR: TSR20

BR: Ubepol BR (Registered Trademark) 150B manufactured by Ube Industries, Ltd. (cis content: 97%, Mw: 440,000)

Carbon Black 1: DIABLACK N220 manufactured by Mitsubishi Chemical Corporation ($N_2SA$: 115 $m^2/g$)

Carbon Black 2: DIABLACK N134 manufactured by Mitsubishi Chemical Corporation ($N_2SA$: 148 $m^2/g$)

Silica 1: Ultrasil VN3 manufactured by Evonik Degussa GmbH ($N_2SA$: 175 $m^2/g$, average primary particle size: 18 nm)

Silica 2: Ultrasil 9100GR manufactured by Evonik Degussa GmbH ($N_2SA$: 230 $m^2/g$, average primary particle size: 15 nm)

Silane coupling agent: Si266 manufactured by Evonik Degussa GmbH (bis(3-triethoxysilylpropyl)disulfide)

Antioxidant: Nocrac 6C manufactured by Ouchi Shinko Chemical Industry Co., Ltd. (N-(1,3-dimethylbutyl)-N'-phenyl-p-phenylenediamine)

Stearic acid: Bead stearic acid "CAMELLIA" manufactured by NOF CORPORATION

Zinc oxide: Zinc oxide No. 1 manufactured by Mitsui Mining & Smelting Co., Ltd.

Sulfur: Powdered sulfur manufactured by Karuizawa Sulfur Co, Ltd.

Vulcanization accelerator 1: Nocceler CZ manufactured by Ouchi Shinko Chemical Industry Co., Ltd. (N-cyclohexyl-2-benzothiazolylsulfenamide (CBS))

Vulcanization accelerator 2: Nocceler D manufactured by Ouchi Shinko Chemical Industry Co., Ltd. (1,3-diphenylguanidine (DPG))

Examples and Comparative Examples

According to the compounding formulations shown in Tables 1 and 2, using a 1.7 L closed Banbury mixer, all chemicals other than sulfur and vulcanization accelerators were kneaded until a discharge temperature at 150° C. to 160° C. for 1 to 10 minutes to obtain a kneaded product. Next, using a twin-screw open roll, sulfur and vulcanization accelerators were added to the obtained kneaded product, and the mixture was kneaded for 4 minutes until the temperature reached 105° C. to obtain an unvulcanized rubber composition. The obtained unvulcanized rubber composition was used to be extruded into shapes of the cap rubber layer and the base rubber layer with an extruder equipped with a mouthpiece having a predetermined shape and attached together with other tire members to prepare an unvulcanized tire having a tread part composed of the above-described two rubber layers, and the unvulcanized tire was press-vulcanized under a condition of 170° C. for 12 minutes to produce each test tire (12R22.5, a tire for a truck/bus) shown in Tables 3 and 4.

The obtained test tires were evaluated as follows. The evaluation results are shown in Tables 3 and 4.

<Viscoelasticity Test>

Vulcanized rubbers were collected from the cap rubber layer and the base rubber layer of each test tire, cut into a width of 4 mm, a length of 40 mm, and a thickness of 2 mm, and a storage elastic modulus E' (MPa) and a loss tangent (tan δ) were measured under a conditions of a temperature at 70° C., an initial strain of 10%, a dynamic strain of ±2%, and a frequency of 10 Hz using a viscoelastic spectrometer manufactured by Iwamoto Seisakusho Co., Ltd.

<Tensile Test>

A dumbbell-shaped No. 7 test piece with a thickness of 1 mm, which was cut out from the base rubber layer of each test tire so that a tire circumferential direction became a tensile direction, was prepared, and according to JIS K 6251: 2017, a tensile test was conducted under a condition of a tensile speed of 3.3 mm/sec in an atmosphere of 23° C. to measure a modulus (MPa) at 200% stretching and an elongation at break EB (%). Besides, a thickness direction of a sample was defined as a tire radial direction.

<Fuel Efficiency>

Using a rolling resistance tester, a rolling resistance when the test tire was run under a condition of a rim of 15×6JJ, an internal pressure of 230 kPa, a load of 3.43 kN, and a speed at 80 km/h was measured, and the inverse value was indicated as an index as Comparative example 2 being 100. The results show that the larger the numerical value is, the smaller the rolling resistance is, and the better the fuel efficiency is.

<Wet Grip Performance Test>

Each test tire was mounted on all wheels of a truck (2-D vehicle) with a maximum load capacity of 10 tons, and a braking distance from an initial speed of 100 km/h was measured on a wet road surface. The measured value was indicated as an index as Comparative example 1 being 100 by the following equation. The results show that the larger the index is, the better the wet grip performance is. Besides, the minimum target value is 100 or more, preferably 105 or more.

(Wet grip performance index)=(braking distance of
Comparative example 2)/(braking distance of
each test tire)×100

<Abrasion Resistance>

Each test tire was mounted on all wheels of a truck (2-D vehicle) with a maximum load capacity of 10 tons, and a groove depth of the tire tread part after running of 8000 km was measured to calculate a running distance when the groove depth of the tire was reduced by 1 mm. The results are shown by indexes according to the following equation, as a running distance when the tire groove of Comparative example 1 was reduced by 1 mm being 100. The results show that the larger the index is, the better the abrasion resistance is.

(Abrasion resistance index)=(running distance when
a tire groove of each test tire was reduced by 1
mm)/(running distance when a tire groove of
Comparative example 2 was reduced by 1
mm)×100

<Chipping Resistance>

Each test tire was mounted on all wheels of a truck (2-D vehicle) with a maximum load capacity of 10 tons, and a block chipping state after running of 8000 km was visually observed and scored. The results are shown by indexes according to the following equation, as a score of Comparative example 1 being 100. The larger the index is, the less the block chipping occurs and the higher the chipping resistance is.

(Chipping resistance index)=(score of each test tire)/
(score of a tire of Comparative example 2)×100

<Tear Resistance>

Presence or absence of occurrence of tear of each test tire after the above-described abrasion resistance test was visually confirmed. Tires with tear were indicated as "+", and those without tear were indicated as "−".

TABLE 1

| | Cap rubber layer | | | | | | | |
| | A1 | A2 | A3 | A4 | A5 | A6 | A7 | A8 |
|---|---|---|---|---|---|---|---|---|
| Compounding amount (part by mass) | | | | | | | | |
| NR | 70 | 80 | 70 | 70 | 70 | 70 | 70 | 70 |
| BR | 30 | 20 | 30 | 30 | 30 | 30 | 30 | 30 |
| Carbon black 1 | 5.0 | 5.0 | 10 | | 55 | — | 5.0 | 40 |
| Carbon black 2 | — | — | — | 25 | — | 50 | — | — |
| Silica 1 | — | — | — | — | — | — | 60 | — |
| Silica 2 | 55 | 55 | 40 | 35 | — | — | — | 20 |
| Silane coupling agent | 5.5 | 5.5 | 6.0 | 3.5 | — | — | 6.0 | 2.0 |
| Antioxidant | 1.0 | 1.0 | 1.0 | 1.0 | 1.0 | 1.0 | 1.0 | 1.0 |
| Stearic acid | 3.0 | 3.0 | 3.0 | 3.0 | 3.0 | 3.0 | 3.0 | 3.0 |
| Zinc oxide | 3.5 | 3.5 | 3.5 | 3.5 | 3.5 | 3.5 | 3.5 | 3.5 |
| Sulfur | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 |
| Vulcanization accelerator 2 | 1.0 | 1.0 | 1.0 | 1.0 | 1.0 | 1.0 | 1.0 | 1.0 |
| 70° C. E' (MPa) | 6.5 | 7.0 | 6.8 | 7.8 | 8.1 | 7.2 | 7.2 | 8.8 |

TABLE 2

| | Base rubber layer | | | | |
| | B1 | B2 | B3 | B4 | B5 |
|---|---|---|---|---|---|
| Compounding amount (part by mass) | | | | | |
| NR | 100 | 100 | 100 | 100 | 100 |
| Carbon black 1 | 35 | 31 | 35 | 40 | 40 |
| Silica 1 | 5.0 | 5.0 | 10 | 5.0 | 5.0 |
| Silane coupling agent | — | — | 1.0 | — | — |
| Antioxidant | 1.5 | 1.5 | 1.5 | 1.5 | 1.5 |
| Stearic acid | 2.0 | 2.0 | 2.0 | 2.0 | 2.0 |
| Zinc oxide | 3.5 | 3.5 | 3.5 | 3.5 | 3.5 |
| Sulfur | 2.5 | 2.5 | 2.5 | 2.8 | 3.2 |
| Vulcanization accelerator 1 | 1.5 | 1.4 | 1.5 | 2.0 | 2.2 |
| 70° C. E' (MPa) | 5.5 | 5.1 | 5.5 | 5.7 | 5.9 |
| 70° C. tan δ | 0.06 | 0.06 | 0.04 | 0.06 | 0.03 |
| 200% modulus (MPa) | 7.0 | 6.0 | 7.0 | 12.0 | 12.0 |
| EB (%) | 440 | 480 | 460 | 420 | 330 |

TABLE 3

| | Example | | | | | | |
| | 1 | 2 | 3 | 4 | 5 | 6 | 7 |
|---|---|---|---|---|---|---|---|
| Cap rubber layer | A1 | A2 | A3 | A4 | A1 | A1 | A1 |
| Base rubber layer | B1 | B1 | B1 | B1 | B2 | B3 | B4 |
| Ec'/Eb' | 1.2 | 1.3 | 1.2 | 1.4 | 1.3 | 1.2 | 1.1 |
| Te/Tt2 | 0.70 | 0.71 | 0.69 | 0.70 | 0.68 | 0.69 | 0.71 |
| Te/Tt1 | 0.66 | 0.65 | 0.65 | 0.64 | 0.66 | 0.67 | 0.65 |
| Tc/Tm | 1.05 | 1.01 | 0.95 | 0.96 | 0.94 | 1.04 | 1.01 |
| Tm/Te | 1.02 | 1.06 | 1.04 | 1.01 | 0.98 | 0.97 | 1.03 |
| Hm/Tt3 | 0.65 | 0.70 | 0.65 | 0.75 | 0.66 | 0.59 | 0.58 |
| Te/Hs | 0.68 | 0.70 | 0.66 | 0.72 | 0.69 | 0.68 | 0.67 |
| Wb/Wa | 0.70 | 0.69 | 0.69 | 0.68 | 0.69 | 0.70 | 0.70 |
| Evaluation | | | | | | | |
| Fuel efficiency | 104 | 102 | 103 | 102 | 103 | 108 | 104 |
| Wet grip performance | 115 | 116 | 112 | 110 | 116 | 115 | 116 |
| Abrasion resistance | 106 | 104 | 108 | 110 | 110 | 106 | 107 |
| Chipping resistance | 120 | 123 | 120 | 124 | 120 | 117 | 115 |
| Occurrence of tear | — | — | — | — | — | — | — |

TABLE 4

| | Comparative example | | | | | |
| | 1 | 2 | 3 | 4 | 5 | 6 |
|---|---|---|---|---|---|---|
| Cap rubber layer | A5 | A6 | A7 | A8 | A6 | A1 |
| Base rubber layer | B1 | B1 | B1 | B1 | B4 | B5 |
| Ec'/ Eb' | 1.5 | 1.3 | 1.3 | 1.6 | 1.3 | 1.1 |
| Te/Tt2 | 0.70 | 0.69 | 0.69 | 0.71 | 0.68 | 0.70 |
| Te/Tt1 | 0.66 | 0.66 | 0.64 | 0.65 | 0.67 | 0.65 |
| Tc/Tm | 1.04 | 1.03 | 1.01 | 0.96 | 1.04 | 1.01 |
| Tm/Te | 1.02 | 1.06 | 1.02 | 1.03 | 1.01 | 1.00 |
| Hm/Tt3 | 0.66 | 0.67 | 0.66 | 0.68 | 0.69 | 0.70 |
| Te/Hs | 0.69 | 0.71 | 0.67 | 0.71 | 0.70 | 0.69 |
| Wb/Wa | 0.69 | 0.69 | 0.68 | 0.70 | 0.70 | 0.68 |
| Evaluation | | | | | | |
| Fuel efficiency | 98 | 100 | 100 | 99 | 100 | 101 |
| Wet grip performance | 101 | 100 | 106 | 93 | 100 | 100 |
| Abrasion resistance | 95 | 100 | 79 | 93 | 92 | 92 |

TABLE 4-continued

| | Comparative example | | | | | |
|---|---|---|---|---|---|---|
| | 1 | 2 | 3 | 4 | 5 | 6 |
| Chipping resistance | 90 | 100 | 1.05 | 92 | 91 | 86 |
| Occurrence of tear | — | — | — | — | + | — |

From the results of Tables 1 to 4, it can be seen that the heavy duty tire of the present disclosure comprising a tread, in which the cap rubber layer comprises a predetermined rubber component and silica and the loss tangent tan δ of the base rubber layer is within a predetermined range, has improved fuel efficiency, wet grip performance, abrasion resistance, chipping resistance, and tear resistance with good balance.

EXPLANATION OF NUMERALS

2. Heavy duty tire
4. Tread
6. Sidewall
10. Bead
12. Carcass
14. Inner liner
18. Belt layer
20. Covering rubber
22. Tread surface
24. Main groove
28. Base rubber layer
30. Cap rubber layer
32. Bead core
34. Apex
36. Carcass ply
38. Outer surface in tire radial direction (of base rubber layer)
EQ. Tire equatorial plane

What is claimed is:

1. A heavy duty tire comprising a carcass extending from a tread part through a sidewall part to a bead core of a bead part and a belt layer arranged outside in a tire radial direction of the carcass and inside of the tread part, wherein the belt layer is formed by a belt ply comprising a first belt layer, a second belt layer, and a third belt layer which are laminated in order from inside in the tire radial direction, wherein the tread has a plurality of main grooves extending continuously in a tire circumferential direction, wherein the tread comprises a cap rubber layer constituting a tread surface and a base rubber layer adjacent to inside in a tire radial direction of the cap rubber layer, wherein the cap rubber layer and the base rubber layer are composed of a rubber composition comprising a rubber component, wherein the rubber component constituting the cap rubber layer comprises 65 to 90% by mass of an isoprene-based rubber and 10 to 35% by mass of a butadiene rubber, wherein the rubber composition constituting the cap rubber layer comprises 45 to 110 parts by mass of silica having a nitrogen adsorption specific surface area (N$_2$SA) of 180 m$^2$/g or more based on 100 parts by mass of the rubber component, wherein a ratio of a storage elastic modulus Ec' of the rubber composition constituting the cap rubber layer at 70° C. is 4.4 to 7.8 MPa, wherein a tan δ of the rubber composition constituting the base rubber layer at 70° C. is 0.04 to 0.07, wherein an elongation at break of the rubber composition constituting the base rubber layer is 380% or more, wherein a ratio of the storage elastic modulus Ec' of the rubber composition constituting the cap rubber layer at 70° C. to a storage elastic modulus Eb' of the rubber composition constituting the base rubber layer at 70° C. (Ec'/Eb') is 1.1 to 1.7, and wherein, when, in a tire meridional cross section including a tire rotation axis, a thickness of the cap rubber layer on a normal line extending from an end of a tire rotation axis direction of the third belt layer down to the tread surface is Te, a thickness of the cap rubber layer at a position half a distance from a tire equatorial plane to the end of the tire rotation axis direction of the third belt layer is Tm, and a thickness of the cap rubber layer on the tire equatorial plane is Tc, Te is smaller than Tc, and Te, Tm, and Tc satisfy the following Mathematical expression (3) and (4):

$$0.85 \leq Tc/Tm \leq 1.15 \tag{3}$$

$$1.00 < Tm/Te \leq 1.15 \tag{4}.$$

2. The heavy duty tire of claim 1, wherein, when, in a tire meridional cross section including a tire rotation axis, a thickness of the cap rubber layer on a normal line extending from an end of a tire rotation axis direction of the third belt layer down to the tread surface is Te, a distance from the third belt layer to the tread surface on the normal line is Tt2, and a distance from the second belt layer to the tread surface on the normal line is Tt1, Te, Tt2, and Tt1 satisfy the following Mathematical expression (1), and (2):

$$0.65 \leq Te/Tt2 \leq 0.75 \tag{1}$$

$$0.60 \leq Te/Tt1 \leq 0.70 \tag{2}.$$

3. The heavy duty tire of claim 2, wherein a ratio of Te to a groove depth Hs of the main groove closest to a tread end (Te/Hs) is 0.50 to 0.90.

4. The heavy duty tire of claim 1, comprising 8 to 18 parts by mass of a sulfide-based silane coupling agent based on 100 parts by mass of the silica compounded in the rubber composition constituting the cap rubber layer.

5. The heavy duty tire of claim 1, wherein the rubber composition constituting the base rubber layer has a modulus of 5.0 to 14.0 MPa at 200% stretching at 23° C.

6. The heavy duty tire of claim 1, wherein a ratio of a groove depth Hm of the main groove closest to the tire equatorial plane to a distance Tt3 from the tread surface on the tire equatorial plane to the outermost belt layer in the tire radial direction (Hm/Tt3) is 0.50 to 0.90.

7. The heavy duty tire of claim 1, wherein a ratio of a distance Wb in a tire rotation axis direction from the tire equatorial plane to a groove edge of the main groove closest to the tire equatorial plane to a distance Wa in a tire rotation axis direction from the tire equatorial plane to a layer end of the outermost belt layer in the tire radial direction (Wb/Wa) is 0.50 to 0.90.

8. The heavy duty tire of claim 1, wherein the rubber composition constituting the cap rubber layer comprises one or more selected from the group consisting of a phenol resin, a cresol resin, and a resorcin resin.

9. The heavy duty tire of claim 1, wherein the rubber component constituting the cap rubber layer comprises 0.5 to 5.0 parts by mass of sulfur based on 100 parts by mass of the rubber component.

10. The heavy duty tire of claim 1, wherein the rubber composition constituting the cap rubber layer comprises 1 to 25 parts by mass of carbon black based on 100 parts by mass of the rubber component.

11. The heavy duty tire of claim 1, wherein a content of silica in a total of 100% by mass of silica and carbon black is 60% by mass or more in the rubber composition constituting the cap rubber layer.

12. A heavy duty tire comprising a carcass extending from a tread part through a sidewall part to a bead core of a bead part and a belt layer arranged outside in a tire radial direction of the carcass and inside of the tread part, wherein the belt layer is formed by a belt ply comprising a first belt layer, a second belt layer, and a third belt layer which are laminated in order from inside in the tire radial direction, wherein the tread has a plurality of main grooves extending continuously in a tire circumferential direction, wherein the tread comprises a cap rubber layer constituting a tread surface and a base rubber layer adjacent to inside in a tire radial direction of the cap rubber layer, wherein the cap rubber layer and the base rubber layer are composed of a rubber composition comprising a rubber component, wherein the rubber component constituting the cap rubber layer comprises 65 to 90% by mass of an isoprene-based rubber and 10 to 35% by mass of a butadiene rubber, wherein the rubber composition constituting the cap rubber layer comprises 45 to 110 parts by mass of silica having a nitrogen adsorption specific surface area ($N_2SA$) of 180 $m^2/g$ or more based on 100 parts by mass of the rubber component, wherein a ratio of a storage elastic modulus Ec' of the rubber composition constituting the cap rubber layer at 70° C. is 4.4 to 7.8 MPa, wherein a tan δ of the rubber composition constituting the base rubber layer at 70° C. is 0.04 to 0.07, wherein an elongation at break of the rubber composition constituting the base rubber layer is 380% or more, wherein the rubber component constituting the base rubber layer comprises 85% by mass or more of an isoprene-based rubber, and wherein a ratio of the storage elastic modulus Ec' of the rubber composition constituting the cap rubber layer at 70° C. to a storage elastic modulus Eb' of the rubber composition constituting the base rubber layer at 70° C. (Ec'/Eb') is 1.1 to 1.7.

13. The heavy duty tire of claim 12, wherein, when, in a tire meridional cross section including a tire rotation axis, a thickness of the cap rubber layer on a normal line extending from an end of a tire rotation axis direction of the third belt layer down to the tread surface is Te, a thickness of the cap rubber layer at a position half a distance from a tire equatorial plane to the end of the tire rotation axis direction of the third belt layer is Tm, and a thickness of the cap rubber layer on the tire equatorial plane is Tc, Te, Tm, and Tc satisfy the following Mathematical expression (3) and (4):

$$0.85 \leq Tc/Tm \leq 1.15 \tag{3}$$

$$0.85 \leq Tm/Te \leq 1.15 \tag{4}.$$

14. The heavy duty tire of claim 12, wherein, when, in a tire meridional cross section including a tire rotation axis, a thickness of the cap rubber layer on a normal line extending from an end of a tire rotation axis direction of the third belt layer down to the tread surface is Te, a distance from the third belt layer to the tread surface on the normal line is Tt2, a distance from the second belt layer to the tread surface on the normal line is Tt1, Te, Tt2, and Tt1 satisfy the following Mathematical expression (1) and (2):

$$0.65 \leq Te/Tt2 \leq 0.75 \tag{1}$$

$$0.60 \leq Te/Tt1 \leq 0.70 \tag{2}.$$

15. The heavy duty tire of claim 12, wherein the rubber composition constituting the base rubber layer has a modulus of 5.0 to 14.0 at 200% stretching at 23° C.

16. The heavy duty tire of claim 12, wherein Te is smaller than Tm and Tc.

17. The heavy duty tire of claim 12, wherein the rubber component constituting the cap rubber layer comprises 0.5 to 5.0 parts by mass of sulfur based on 100 parts by mass of the rubber component.

18. The heavy duty tire of claim 12, wherein the rubber composition constituting the cap rubber layer comprises 1 to 25 parts by mass of carbon black based on 100 parts by mass of the rubber component.

19. The heavy duty tire of claim 12, wherein a content of silica in a total of 100% by mass of silica and carbon black is 60% by mass or more in the rubber composition constituting the cap rubber layer.

\* \* \* \* \*